US012620217B2

(12) United States Patent (10) Patent No.: US 12,620,217 B2
Takahashi et al. (45) Date of Patent: May 5, 2026

(54) TRAINING DEVICE, TRAINING METHOD, AND TRAINING PROGRAM

(71) Applicant: NTT, Inc., Tokyo (JP)

(72) Inventors: Tomokatsu Takahashi, Musashino (JP); Masanori Yamada, Musashino (JP); Tomoya Yamashita, Musashino (JP); Yuki Yamanaka, Musashino (JP)

(73) Assignee: NTT, Inc., Tokyo (JP)

( * ) Notice: Subject to any disclaimer, the term of this patent is extended or adjusted under 35 U.S.C. 154(b) by 240 days.

(21) Appl. No.: 18/701,624

(22) PCT Filed: Nov. 8, 2021

(86) PCT No.: PCT/JP2021/041037
§ 371 (c)(1),
(2) Date: Apr. 16, 2024

(87) PCT Pub. No.: WO2023/079756
PCT Pub. Date: May 11, 2023

(65) Prior Publication Data
US 2024/0412502 A1 Dec. 12, 2024

(51) Int. Cl.
*G06V 10/82* (2022.01)
(52) U.S. Cl.
CPC .................................... *G06V 10/82* (2022.01)
(58) Field of Classification Search
None
See application file for complete search history.

(56) References Cited

U.S. PATENT DOCUMENTS

| 11,803,758 | B2 * | 10/2023 | Liu | .................... | G06V 10/7784 |
| 2019/0012611 | A1 * | 1/2019 | Matsumura | ............ | G06N 20/00 |
| 2020/0050962 | A1 * | 2/2020 | Kim | ....................... | G06N 3/045 |
| 2020/0327443 | A1 * | 10/2020 | Van Vredendaal | .... | G06N 20/00 |
| 2020/0410341 | A1 * | 12/2020 | Otsuki | ................... | G06N 20/00 |

OTHER PUBLICATIONS

Madry et al., "Towards Deep Learning Models Resistant to Adversarial Attacks", arXiv:1706.06083v4, Sep. 4, 2019, pp. 1-28.

* cited by examiner

*Primary Examiner* — Haris Sabah
(74) *Attorney, Agent, or Firm* — XSENSUS LLP

(57) ABSTRACT

A learning device includes processing circuitry configured to calculate a degree of deviation between a first output obtained by inputting first training data to a learned first model and a second output obtained by inputting second training data created by giving noise to the first training data to a second model, and a degree of deviation between an intermediate representation of the first model generated in a process of obtaining the first output and an intermediate representation of the second model generated in a process of obtaining the second output, and update a parameter of the second model so that the degree of deviation between the first output and the second output and the degree of deviation between the intermediate representation of the first model and the intermediate representation of the second model are reduced.

5 Claims, 7 Drawing Sheets

Fig. 2

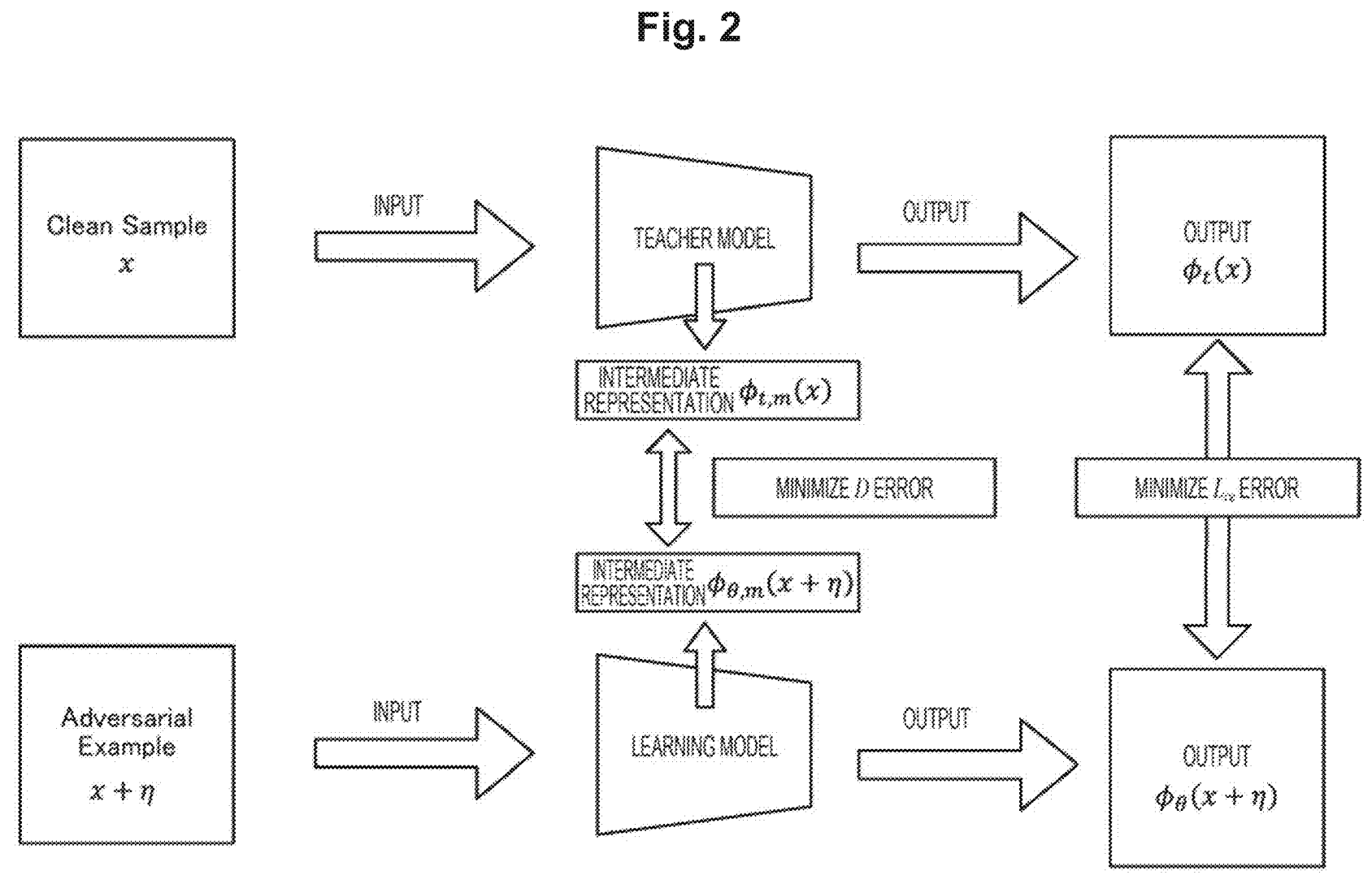

Clean Sample $x$

INPUT

TEACHER MODEL

INTERMEDIATE REPRESENTATION $\phi_{t,m}(x)$

OUTPUT

OUTPUT $\phi_t(x)$

MINIMIZE $L_{\infty}$ ERROR

MINIMIZE $D$ ERROR

Adversarial Example $x + \eta$

INPUT

LEARNING MODEL

INTERMEDIATE REPRESENTATION $\phi_{\theta,m}(x + \eta)$

OUTPUT

OUTPUT $\phi_\theta(x + \eta)$ test_clean_accuracy test_robust_accuracy

Fig. 5

|  | Standard Adversarial Training | proposed |
|---|---|---|
| Clean | 0.8094 | 0.8223 |
| PGD | 0.5229 | 0.5428 |
| Auto Attack | 0.4787 | 0.4918 |

Fig. 6

TRAINING DEVICE, TRAINING METHOD, AND TRAINING PROGRAM

CROSS-REFERENCE TO RELATED APPLICATION

This application is a national stage application, pursuant to 35 U.S.C. § 371, of International Patent Application No. PCT/JP2021/041037, filed Nov. 8, 2021, the entire contents of which are incorporated herein by reference.

TECHNICAL FIELD

The present invention relates to a learning device, a learning method, and a learning program.

BACKGROUND ART

In the related art, adversarial training is known as a technique for creating deep learning models that are robust against adversarial examples (adversarial samples).

An adversarial example is created by adding a small artificial perturbation that cannot be perceived by humans to a certain sample (clean sample). Adversarial examples may be used as adversarial input samples to perturb the output of deep learning.

For example, in image classification, an adversarial example image is created by applying an artificial perturbation to a certain image.

Such an image causes the classification result of deep learning to be erroneously classified as that of a different image while maintaining the appearance of the original image.

For example, in a case where the type of sign recognized by a vehicle that automatically drives is changed from the original one to another, it is conceivable that the vehicle erroneously recognizes the sign.

Non Patent Literature 1 describes adversarial training that enhances robustness of a deep learning model by incorporating an adversarial example into training data in advance.

CITATION LIST

Non Patent Literature

Non Patent Literature 1: Aleksander Madry, Aleksandar Makelov, Ludwig Schmidt, Dimitris Tsipras, Adrian Vladu, "Towards Deep Learning Models Resistant to Adversarial Attacks" (://arxiv.org/abs/1706.06083)

SUMMARY OF INVENTION

Technical Problem

However, the related art has a problem in that accuracy for the clean sample may be reduced when enhancing robustness of the model to the adversarial example.

For example, a deep learning model trained by adversarial training described in Non Patent Literature 1 shows a certain degree of robustness to the adversarial example, but the accuracy for the clean sample may decrease.

Solution to Problem

In order to solve the above-described problems and achieve the object, a learning device includes: processing circuitry configured to: calculate a degree of deviation between a first output obtained by inputting first training data to a learned first model and a second output obtained by inputting second training data created by giving noise to the first training data to a second model, and a degree of deviation between an intermediate representation of the first model generated in a process of obtaining the first output and an intermediate representation of the second model generated in a process of obtaining the second output; and update a parameter of the second model so that the degree of deviation between the first output and the second output and the degree of deviation between the intermediate representation of the first model and the intermediate representation of the second model are reduced.

Advantageous Effects of Invention

According to the present invention, it is possible to suppress a decrease in accuracy for a clean sample when enhancing robustness of a model to an adversarial example.

BRIEF DESCRIPTION OF DRAWINGS

FIG. 2 is a diagram illustrating learning processing.

FIG. 5 is a diagram illustrating test results.

FIG. 6 is a diagram illustrating a configuration example of a vehicle control system.

DESCRIPTION OF EMBODIMENTS

Hereinafter, embodiments of a learning device, a learning method, and a learning program according to the present application will be described in detail with reference to the drawings. Note that the present invention is not limited to the embodiments described below.

Here, in the conventional adversarial training, for example, minimization of an error function Lee as illustrated in Formula (1) is performed.

[Math. 1]

$$\min_{\theta} L_{ce}(\phi_\theta(x + \eta), y) \tag{1}$$

Furthermore, noise $\eta$ (adversarial noise) is set as in Formula (2) so that the error function is maximized under a constraint S of the noise magnitude.

[Math. 2]

$$\eta = \arg\max_{\eta \in S} L_{ce}(\phi_\theta(x + \eta), y) \tag{2}$$

Here, x is an input training sample. y is a label attached to the sample. The training data is a combination of x and y. In addition, $\varphi_\theta$ is a model having a parameter $\theta$ (for example, a deep learning model).

Note that x corresponds to a clean sample. In addition, x+$\eta$ corresponds to an adversarial example.

When x+η in Formula (1) is replaced with x, an error function for learning the clean sample is obtained. Therefore, it can be said that the adversarial example is learned in the same way as the clean sample in the conventional adversarial training.

In other words, in conventional adversarial training, there is only a constraint that the adversarial example is classified into the same label as the clean sample that is the source. For this reason, in the related art, an adversarial example, which is a special input, may be learned as another data having the same label as the clean sample.

As a result, a learned model may fail to extract a feature used for classification of clean samples, or may perform classification using special noise n when creating an adversarial example. In this way, in the conventional adversarial training, the performance of the model may deteriorate.

One object of the present embodiment is to suppress a decrease in accuracy for a clean sample when enhancing robustness of a model to an adversarial example.

Configuration of First Embodiment

Figure 1:
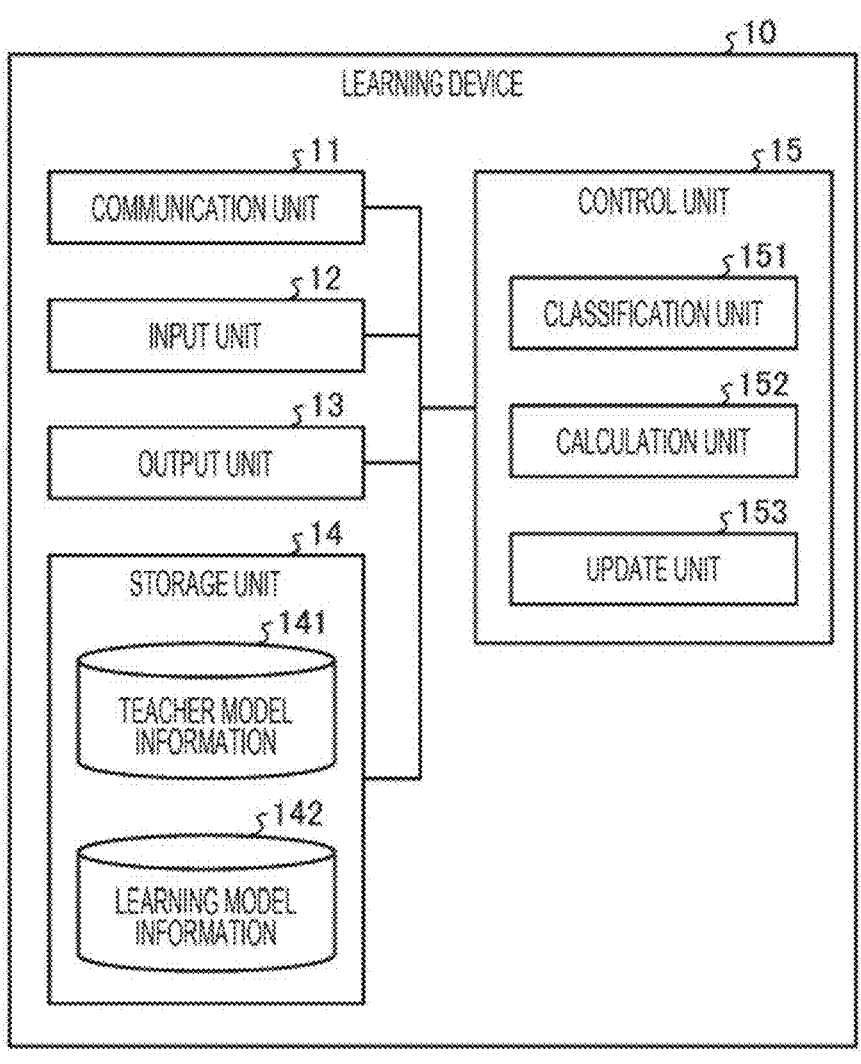
FIG. 1 is a diagram illustrating a configuration example of a learning device according to a first embodiment.

First, a configuration of a learning device according to a first embodiment will be described with reference to FIG. 1. FIG. 1 is a diagram illustrating an example of the configuration of the learning device according to the first embodiment.

A learning device 10 receives inputs of clean samples and adversarial examples, and outputs a learned deep learning model. The learning device 10 may create adversarial examples from clean samples without receiving an input of adversarial examples.

As illustrated in FIG. 1, the learning device 10 includes a communication unit 11, an input unit 12, an output unit 13, a storage unit 14, and a control unit 15.

The communication unit 11 performs data communication with other devices via a network. For example, the communication unit 11 is a network interface card (NIC).

The input unit 12 receives an input of data from a user. The input unit 12 is, for example, an input device such as a mouse or a keyboard.

The output unit 13 outputs data by displaying a screen or the like. The output unit 13 is, for example, a display device such as a display.

The storage unit 14 is a storage device such as a hard disk drive (HDD), a solid state drive (SSD), or an optical disc. Note that the storage unit 14 may be a semiconductor memory capable of rewriting data, such as a random access memory (RAM), a flash memory, or a non volatile static random access memory (NVSRAM).

The storage unit 14 stores an operating system (OS) and various programs executed by the learning device 10.

The storage unit 14 stores teacher model information 141 and learning model information 142.

For example, the teacher model information 141 and the learning model information 142 are weights and biases of a teacher model which is a deep learning model and a neural network constituting the learning model, respectively. The teacher model and the learning model will be described later.

The control unit 15 controls the entire learning device 10. The control unit 15 is, for example, an electronic circuit such as a central processing unit (CPU), a micro processing unit (MPU), or a graphics processing unit (GPU), or an integrated circuit such as an application specific integrated circuit (ASIC) or a field programmable gate array (FPGA).

Further, the control unit 15 includes an internal memory for storing programs and control data defining various processing procedures, and executes each processing operation using the internal memory.

Furthermore, the control unit 15 functions as various processing units by operating various programs. For example, the control unit 15 includes a classification unit 151, a calculation unit 152, and an update unit 153.

Learning processing performed by the classification unit 151, the calculation unit 152, and the update unit 153 will be described with reference to FIG. 2. FIG. 2 is a diagram illustrating learning processing.

The classification unit 151 classifies an input sample into classes on the basis of an output obtained by inputting the input sample into the model. For example, the model may recognize an object appearing in an image and output a score for each class. At that time, the sample is an image.

In addition, the classification unit 151 is not limited to the classification task, and may perform inference using a learned model.

Here, the teacher model is a learned deep learning model, and is constructed on the basis of the teacher model information 141. Note that the teacher model may be a deep learning model trained using only clean samples.

Furthermore, the learning model is a deep learning model to be trained by the learning device 10, and is constructed on the basis of the learning model information 142.

As illustrated in FIG. 2, the classification unit 151 inputs a clean sample x to the teacher model and executes classification. In addition, the classification unit 151 inputs an adversarial example x+n to the learning model and executes classification.

Note that the classification unit 151 can calculate the noise n by a method described in the following reference literature.

REFERENCE LITERATURE

://arxiv.org/abs/1412.6572

The calculation unit 152 calculates a degree of deviation $L_{ce}$ between an output $\varphi_t(x)$ obtained by inputting a clean sample x to a learned teacher model and an output $\varphi_\theta(x)$ obtained by inputting an adversarial example x+n created by giving noise n to the clean sample x to a learning model, and a degree of deviation D between an intermediate representation $\varphi_{t,m}(x)$ of the teacher model generated in the process of obtaining the output (t (x) and an intermediate representation $\varphi_{\theta,m}(x+\eta)$ of the learning model generated in the process of obtaining the output $\varphi_\theta(x)$.

The teacher model is an example of a first model. Also, the clean sample x is an example of first training data. $\varphi_t(x)$ is an example of a first output. t is a parameter of the teacher model. The learning model is an example of a second model. The adversarial example x+n is an example of second training data. $\varphi_\theta(x)$ is an example of a second output. θ is a parameter of the learning model. Note that x may be an image or a feature amount extracted from the image.

In addition, it is assumed that $\varphi_{\alpha,\beta}(\gamma)$ is a vector representing the output of the β-th layer when γ is input to the neural network constructed from the parameter α. In addition, it is assumed that $\varphi_\alpha(\gamma)$ is a vector representing an output of a final layer when γ is input to the neural network constructed from the parameter α.

In addition, it is assumed that the number of layers and the number of nodes in each layer are the same between the neural network of the teacher model and the neural network of the learning model. Therefore, the intermediate representation $\varphi_{t,m}(x)$ and the intermediate representation $\varphi_{\theta,m}(x+\eta)$ are vectors of the same size.

At this time, the calculation unit 152 calculates a degree of deviation between the output $\varphi_t(x)$, which is an output of a final layer of the teacher model that is a neural network, and the output $\varphi_\theta(x)$, which is an output of a final layer of the learning model that is a neural network having the same topology as the teacher model, and a degree of deviation between the intermediate representation $\varphi_{t,m}(x)$, which is an output of an intermediate layer of the teacher model, and the intermediate representation $\varphi_{\theta,m}(x+\eta)$, which is an output of an intermediate layer of the learning model in the same layer (m-th layer) as the intermediate layer.

The calculation unit 152 can calculate an error function as in Formula (3).

[Math. 3]

$$\min_{\theta} L_{ce}(\phi_\theta(x+\eta),\ \phi_t(x)) + D(\phi_{\theta,m}(x+\eta),\ \phi_{t,m}(x)) \qquad (3)$$

The update unit 153 updates the parameter of the learning model so that the degree of deviation $L_{ce}$ between the output $\varphi_t(x)$ and the output $\varphi_\theta(x)$ and the degree of deviation between the intermediate representation $\varphi_{t,m}(x)$ of the teacher model and the intermediate representation $\varphi_{\theta,m}(x+\eta)$ of the learning model are reduced.

The update unit 153 updates the parameter of the learning model, that is, the learning model information 142 so that the error function of Formula (3) is minimized. For example, the update unit 153 updates the parameter by backpropagation.

In this manner, the learning device 10 can optimize the learning model for both the output and the intermediate representation.

Processing of First Embodiment

Figure 3:
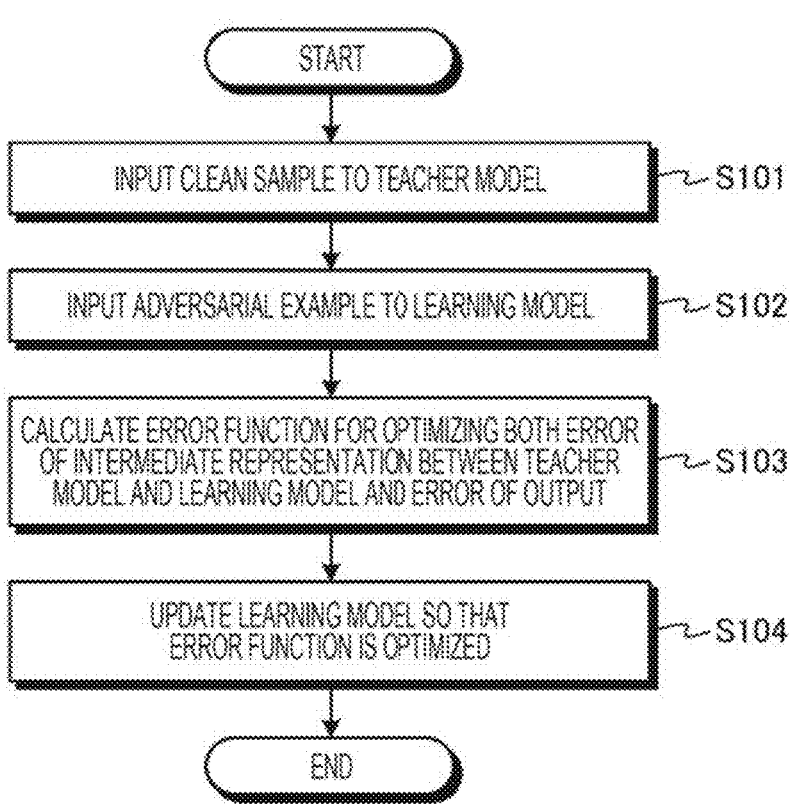
FIG. 3 is a flowchart illustrating a flow of processing of the learning device according to the first embodiment.

FIG. 3 is a flowchart illustrating a flow of processing of the learning device according to the first embodiment. As illustrated in FIG. 3, first, the learning device 10 inputs a clean sample to the teacher model (step S101). It is assumed that the teacher model has been learned by the clean sample or another clean sample input in step S101.

Next, the learning device 10 inputs an adversarial example to the learning model (step S102). The adversarial example is created by giving noise to the clean sample in step S101.

Here, the learning device 10 calculates an error function for optimizing both the error of the intermediate representation between the teacher model and the learning model and the error of the output (step S103). For example, the learning device 10 calculates an error function shown in Formula (3).

Then, the learning device 10 updates the learning model so that the error function is optimized (step S104). For example, the learning device 10 updates the learning model information 142. The learning device 10 can output the updated learning model information 142.

Effects of First Embodiment

As described above, the calculation unit 152 calculates a degree of deviation between a first output obtained by inputting first training data to the learned first model and a second output obtained by inputting second training data created by giving noise to the first training data to the second model, and a degree of deviation between an intermediate representation of the first model generated in the process of obtaining the first output and an intermediate representation of the second model generated in the process of obtaining the second output. The update unit 153 updates the parameter of the second model so that the degree of deviation between the first output and the second output and the degree of deviation between the intermediate representation of the first model and the intermediate representation of the second model are reduced.

In this manner, the learning device 10 can perform training so that the intermediate representation is optimized in addition to the output of the model. Thus, according to the present embodiment, it is possible to suppress a decrease in accuracy for the clean sample when enhancing the robustness of the model to the adversarial example.

The calculation unit 152 calculates a degree of deviation between the first output, which is an output of a final layer of the first model that is a neural network, and the second output, which is an output of a final layer of the second model that is a neural network having the same topology as the first model, and a degree of deviation between a first intermediate representation, which is an output of an intermediate layer of the first model, and a second intermediate representation, which is an output of an intermediate layer of the second model in the same layer as the intermediate layer.

Accordingly, since the output and the intermediate representation can be acquired as vectors of the same size from each model, the degree of deviation can be easily calculated.

The calculation unit 152 calculates a degree of deviation between the first output obtained by inputting the first training data that is an image to the first model and the second output obtained by inputting the second training data that is an image created by giving noise to the first training data to the second model.

Accordingly, it is possible to reduce damage of an attack on a system that performs image recognition by deep learning (for example, a sign classification system to be described later).

[Test Results]

Figure 4:
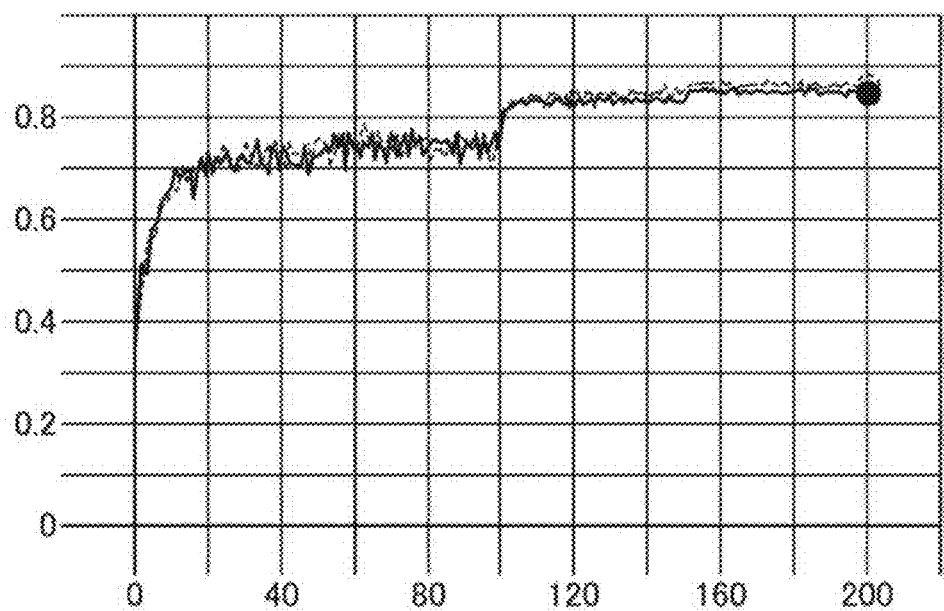
FIG. 4 is a diagram illustrating test results.
Figure 4:
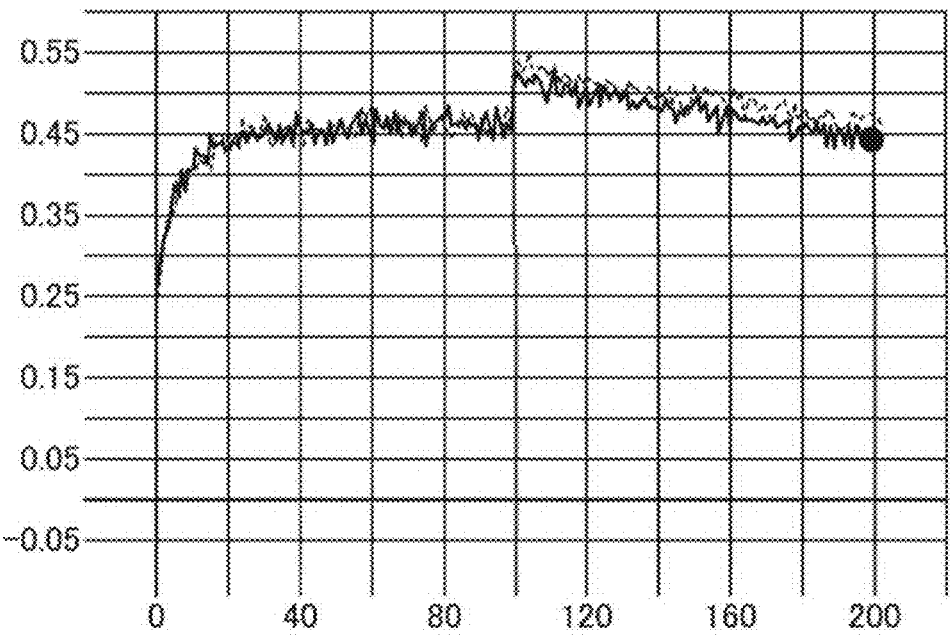

Tests performed using the present embodiment will be described with reference to FIGS. 4 and 5. FIGS. 4 and 5 are diagrams illustrating test results.

The deep learning model (teacher model and learning model) in the test is ResNet18 (reference literature: ://arxiv.org/abs/1512.03385). Further, it is cifar10 (reference literature: .cs.toronto.edu/~kriz/cifar.html).

In addition, methods for creating the adversarial example in the test (attack method) are projected gradient descent (PGD) (reference literature: Non Patent Literature 1) and Auto Attack (reference literature: ://arxiv.org/abs/2003.01690)

The degree of deviation D of the intermediate representation in the test is LPIPS distance (reference literature: ://arxiv.org/abs/1801.03924).

In each of the graphs in FIG. 4, the vertical axis represents accuracy (image classification accuracy), and the horizontal axis represents the number of epochs (progress of learning). In addition, a broken line in FIG. 4 indicates the accuracy of the model in a case where learning is performed using the embodiment. In addition, a solid line in FIG. 4 indicates the accuracy of the model in a case where learning is performed using the related art.

test_clean_accuracy is accuracy for the clean sample. In addition, test_robust_accuracy is accuracy for the adversarial example created by PGD. From FIG. 4, it can be said that the present embodiment tends to be higher than the related art in terms of any accuracy.

Furthermore, FIG. 5 illustrates a result of performance measurement performed on a model having the highest test_robust_accuracy. "Standard adversarial training" corresponds to the related art. Also, "proposed" corresponds to the present embodiment.

From FIG. 5, it can be said that the present embodiment exhibits higher accuracy than the related art in terms of any case.

In addition, from the results of tests, it can be said that in the present embodiment, not only the accuracy but also the robustness to the adversarial example are improved as compared with the related art.

Example

The deep learning model trained by the learning device 10 according to the present embodiment is used in, for example, a vehicle control system including a sign classification system.

Figure 6:
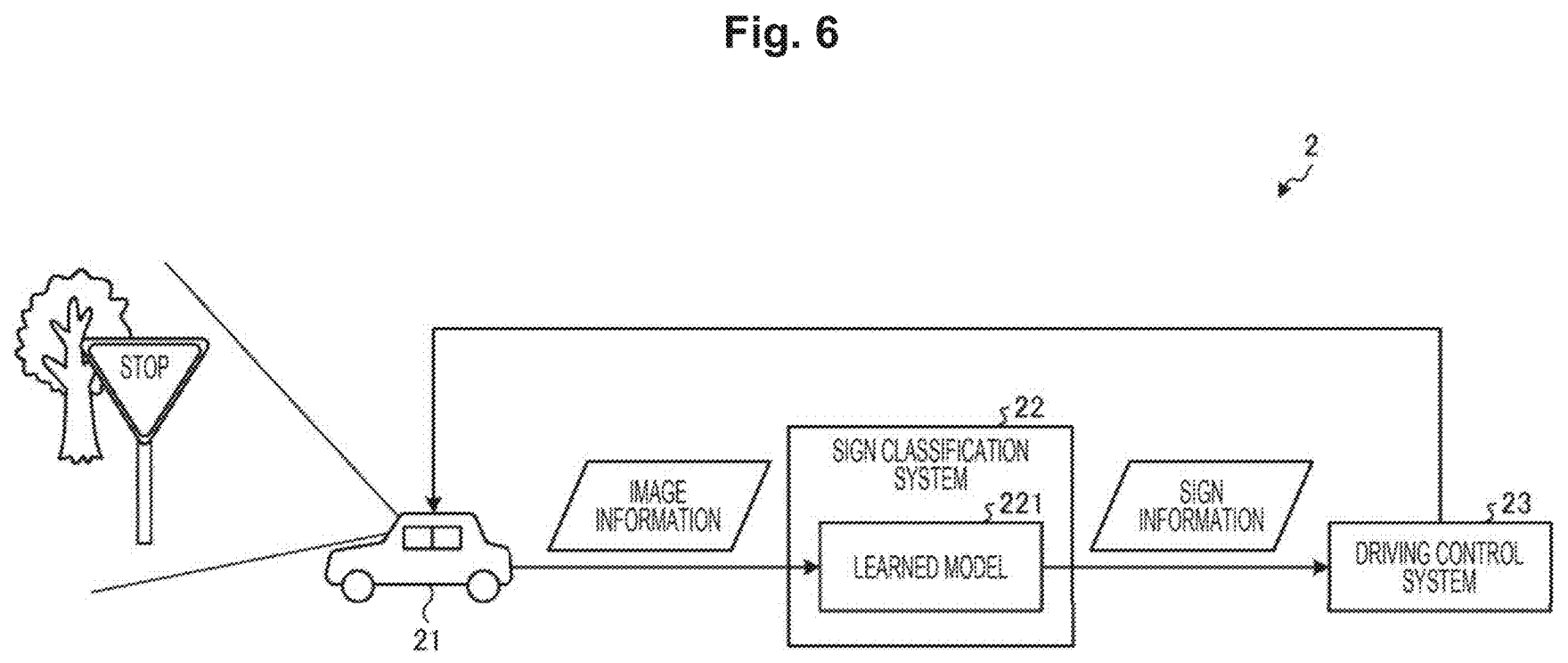

FIG. 6 is a diagram illustrating a configuration example of a vehicle control system. As illustrated in FIG. 6, a vehicle control system 2 includes a vehicle 21, a sign classification system 22, and a driving control system 23.

The vehicle 21 is an automated vehicle. In addition, the vehicle 21 is provided with an in-vehicle camera that captures an image. Further, the sign classification system 22 and the driving control system 23 are implemented by an electronic control unit (ECU) or the like provided in the vehicle 21.

The sign classification system 22 can classify a sign appearing in an image on the basis of image information regarding the image captured by the vehicle 21 using the learned model 221 that is a deep learning model trained by the learning device 10.

The sign classification system 22 inputs sign information that is a classification result of a sign to the driving control system 23. The driving control system 23 controls acceleration, deceleration, steering, and the like of the vehicle 21 according to the input sign information.

Here, the learned model 221 is robust to adversarial example attacks. Therefore, a risk that the sign classification system 22 erroneously recognizes a sign, and as a result, the driving control system 23 performs erroneous control, and an accident or the like occurs is reduced.

According to the present embodiment, not only the driving control system but also various products can be protected from adversarial examples.

[System Configuration and Others]

In addition, each component of each illustrated device is functionally conceptual, and does not necessarily need to be physically configured as illustrated. That is, a specific form of distribution and integration of the respective devices is not limited to the illustrated form, and all or some of the devices can be functionally or physically distributed or integrated in any unit, depending on various loads, usage conditions, and the like. Furthermore, all or an arbitrary part of each processing function performed in each device can be implemented by a central processing unit (CPU) and a program analyzed and executed by the CPU, or can be implemented as hardware by wired logic. Note that the program may be executed not only by a CPU but also by another processor such as a GPU.

Further, among processing operations described in the present embodiment, all or some of processing operations described as being automatically performed can be manually performed, or all or some of processing operations described as being manually performed can be automatically performed by a known method. In addition, processing procedures, control procedures, specific name, and information including various kinds of data and parameters illustrated in the specification and the drawings can be arbitrarily changed unless otherwise specified.

[Program]

As an embodiment, the learning device 10 can be implemented by installing a learning program for executing the above learning processing as packaged software or online software in a desired computer. For example, an information processing device can be caused to function as the learning device 10 by causing the information processing device to execute the above learning program. The information processing device mentioned here includes a desktop or a laptop personal computer. Moreover, the information processing device also includes a mobile communication terminal such as a smartphone, a mobile phone, and a personal handyphone system (PHS), a slate terminal such as a personal digital assistant (PDA), and the like.

Moreover, the learning device 10 can also be implemented as a learning server device that uses a terminal device used by the user as a client and provides the client with a service related to the learning processing described above. For example, the learning server device is implemented as a server device that provides a learning service having clean sample as an input and a learned model as an output. In this case, the learning server device may be implemented as a web server, or may be implemented as a cloud that provides a service related to the learning processing by outsourcing.

Figure 7:
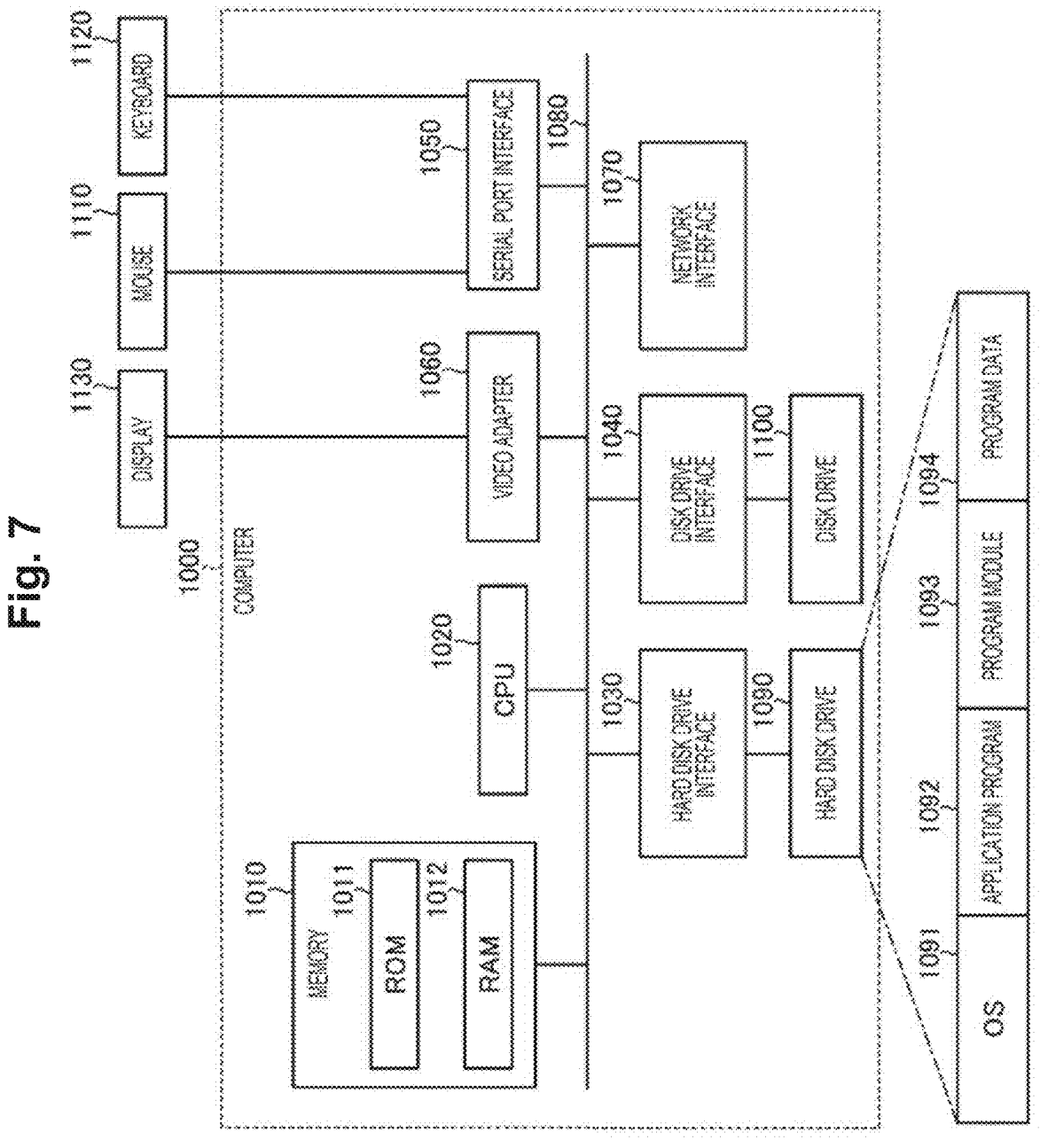
FIG. 7 is a diagram illustrating an example of a computer that executes a learning program.

FIG. 7 is a diagram illustrating an example of a computer that executes the learning program. A computer 1000 includes, for example, a memory 1010 and a CPU 1020. Further, the computer 1000 also includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, the program that defines each processing operation of the learning device 10 is implemented as the program module 1093 in which codes executable by a computer are described. The program module 1093 is stored in, for example, the hard disk drive 1090. For example, the program module 1093 for executing processing similar to the functional configuration in the learning device 10 is stored in the hard disk drive 1090. Note that the hard disk drive 1090 may be replaced with a solid state drive (SSD).

In addition, setting data used in the processing of the above-described embodiment is stored, for example, in the memory 1010 or the hard disk drive 1090 as the program data 1094. Then, the CPU 1020 reads the program module 1093 and the program data 1094 stored in the memory 1010 and the hard disk drive 1090 to the RAM 1012 as necessary, and executes the processing of the above-described embodiment.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (a local area network (LAN), a wide area network (WAN), or the like). Then, the program module 1093 and the program data 1094 may be read by the CPU 1020 from another computer via the network interface 1070.

REFERENCE SIGNS LIST

2 Vehicle control system
10 Learning device
11 Communication unit
12 Input unit
13 Output unit
14 Storage unit
15 Control unit
21 Vehicle
22 Sign classification system
23 Driving control system
141 Teacher model information
142 Learning model information
151 Classification unit
152 Calculation unit
153 Update unit
221 Learned model

The invention claimed is:

1. A learning device comprising:
processing circuitry configured to:
    calculate a degree of deviation between a first output obtained by inputting first training data to a learned first model and a second output obtained by inputting second training data created by giving noise to the first training data to a second model, and a degree of deviation between an intermediate representation of the first model generated in a process of obtaining the first output and an intermediate representation of the second model generated in a process of obtaining the second output; and
    update a parameter of the second model so that the degree of deviation between the first output and the second output and the degree of deviation between the intermediate representation of the first model and the intermediate representation of the second model are reduced.

2. The learning device according to claim 1, wherein the processing circuitry is further configured to calculate a degree of deviation between the first output, which is an output of a final layer of the first model that is a neural network, and the second output, which is an output of a final layer of the second model that is a neural network having a same topology as the first model, and a degree of deviation between a first intermediate representation, which is an output of an intermediate layer of the first model, and a second intermediate representation, which is an output of an intermediate layer of the second model in a same layer as the intermediate layer.

3. The learning device according to claim 1, wherein the processing circuitry is further configured to calculate a degree of deviation between the first output obtained by inputting the first training data that is an image to the first model and the second output obtained by inputting the second training data that is an image created by giving noise to the first training data to the second model.

4. A learning method executed by a learning device, the learning method comprising:
    calculating a degree of deviation between a first output obtained by inputting first training data to a learned first model and a second output obtained by inputting second training data created by giving noise to the first training data to a second model, and a degree of deviation between an intermediate representation of the first model generated in a process of obtaining the first output and an intermediate representation of the second model generated in a process of obtaining the second output; and
    updating a parameter of the second model so that the degree of deviation between the first output and the second output and the degree of deviation between the intermediate representation of the first model and the intermediate representation of the second model are reduced.

5. A non-transitory computer-readable recording medium storing therein a learning program that causes a computer to execute a process comprising:
    calculating a degree of deviation between a first output obtained by inputting first training data to a learned first model and a second output obtained by inputting second training data created by giving noise to the first training data to a second model, and a degree of deviation between an intermediate representation of the first model generated in a process of obtaining the first output and an intermediate representation of the second model generated in a process of obtaining the second output; and
    updating a parameter of the second model so that the degree of deviation between the first output and the second output and the degree of deviation between the intermediate representation of the first model and the intermediate representation of the second model are reduced.

* * * * *